United States Patent [19]

Ecktman et al.

[11] Patent Number: 5,201,500
[45] Date of Patent: Apr. 13, 1993

[54] SNAP-ON BUMPER FOR AIR SPRING

[75] Inventors: Jack D. Ecktman, Indianapolis; Michael M. Brown, Fishers, both of Ind.

[73] Assignee: Bridgestone/Firestone, Inc., Akron, Ohio

[21] Appl. No.: 661,280

[22] Filed: Feb. 26, 1991

[51] Int. Cl.⁵ .......................... F16M 1/00; F16M 3/00; F16M 9/00; F16M 11/00
[52] U.S. Cl. .................................. 267/140; 267/139; 267/136; 267/267; 267/64; 267/27; 403/50; 188/299; 188/322.11
[58] Field of Search .................... 267/121, 8 R, 64.27, 267/267, 140, 64.22, 64.23; 200/159 R; 280/711; 105/215 C; 188/299, 322.11; 403/1, 2, 46, 50, 51, 174, 335, 365, 333, 217, 241

[56] References Cited
U.S. PATENT DOCUMENTS

| | | | |
|---|---|---|---|
| 3,658,314 | 4/1972 | Luzsicza | 267/121 |
| 4,218,599 | 8/1980 | Garn | 200/159 R |
| 4,342,264 | 8/1982 | Hindin et al. | 105/215 C |
| 4,478,396 | 10/1984 | Kawaura | 267/8 R |
| 4,506,910 | 3/1985 | Bierens | 280/711 |
| 4,639,159 | 1/1987 | Amrath | 403/50 |
| 4,787,606 | 11/1988 | Geno et al. | 267/64.27 |
| 4,852,861 | 8/1989 | Harris | 267/64.27 |
| 4,925,224 | 5/1990 | Smiszek | 267/140 |
| 4,946,144 | 8/1990 | Geno et al. | 267/64.27 |

Primary Examiner—Joseph F. Peters, Jr.
Assistant Examiner—Kenneth Lee
Attorney, Agent, or Firm—Ernst H. Ruf

[57] ABSTRACT

An air spring has pair of spaced end members for mounting the spring at spaced locations on a structure. A flexible sleeve of elastomeric material is sealingly engaged with the end members and forms a pressurized fluid chamber therebetween. A post is mounted on one of the end members and extends into the fluid chamber. A shock absorbing bumper formed of a high strength plastic is snap-fitted on an enlarged top of the post. A plurality of circumferentially arranged flexible fingers define an opening in a base of the bumper, and are snap-fitted over the enlarged top of the post which extends into the opening and seat into an annular undercut formed in the post beneath the enlarged top. The snap-fitted plastic bumper replaces the heretofore used elastomeric bumper.

17 Claims, 4 Drawing Sheets

SNAP-ON BUMPER FOR AIR SPRING

BACKGROUND OF THE INVENTION

1. Technical Field

The invention relates to air springs and in particular to air springs having an internal bumper which acts as a backup in case of air spring failure or to absorb sudden large deflections or shocks imparted on the air spring. More particularly, the invention relates to an air spring having a snap-on plastic bumper replacing the heretofore used elastomeric bumper.

2. Background Information

Pneumatic springs, commonly referred to as air springs, have been used for motor vehicles and various machines and other equipment for a number of years to provide cushioning between movable parts, primarily to absorb shock loads imparted thereon. The air spring usually consists of a flexible rubber sleeve which extends between a pair of end members which contains a supply of compressed air and may have one or more pistons located within the flexible sleeve. The end members mount the air spring on spaced components or parts of the vehicle or equipment on which the air spring is mounted.

The internal pressurized fluid which is generally air, absorbs most of the shock impressed upon or experienced by one of the spaced end members by which the air spring is mounted, with the end members moving axially towards and away from each other upon absorbing the imparted shock. Examples of such air springs are shown in U.S. Pat. Nos. 4,852,861 and 4,946,144.

Certain of these prior art air springs have internal bumpers mounted on one of the end members which extends into the interior of the pressurized chamber The bumper prevents total collapse or deflection of the spring member in the event of air spring failure, or to absorb shock upon the spring experiencing severe shocks and deflections. Heretofore, these bumpers consisted of an elastomeric member which was mounted on a stud extending outwardly from one of the end members such as shown in U.S. Pat. Nos. 4,506,910 and 4,787,606. Although these elastomeric bumpers are satisfactory for most applications, the bumpers require a lubricant and special equipment to assemble the bumpers on the projecting studs. This results in additional cost for both the lubrication and assembly equipment.

Therefore, the need exists for an improved type of air spring bumper which eliminates the heretofore used elastomeric bumper and the expensive equipment required for mounting the bumper on its internal supporting stud.

Examples of other prior art showing shock absorbing components are set forth in the following patents.

U.S. Pat. No. 4,478,396 discloses an elastomeric bumper which is mounted on the top of a vehicle strut.

U.S. Pat. No. 3,658,314 discloses a fluid shock absorber having an elastomeric member mounted between two concentrically movable tubes with an elastomeric bumper mounted beneath the inner tube to absorb impact from the tube.

U.S. Pat. No. 4,342,264 shows another type of air spring using an elastomeric bumper mounted on one of the end members.

U.S. Pat. No. 4,218,599 discloses a polymer spring for use in a drawer of a cabinet to ensure that when the drawer is closed it does not rebound to a partially opened position.

However, no known prior art including those discussed above, disclose an air spring having an internal bumper which is formed of a plastic material and is snap-fitted into position on a bumper mounting stud to replace the heretofore used elastomeric bumpers.

SUMMARY OF THE INVENTION

An objective of the invention includes providing an improved air spring construction for motor vehicles and other types of equipment having spaced movable end members and a plastic bumper mounted within a pressurized chamber extending between the end members for absorbing excessive shock imparted on the end members.

A further objective of the invention is to provide such an improved air spring in which the shock absorbing bumper is formed of a high strength plastic material to absorb sudden large deflections and to act as a backup device in case of air spring failure.

Still another objective of the invention is to provide such an improved air spring in which the internal bumper is snap-fitted into position on a stud which is attached to one of the end members and extends into the fluid chamber, eliminating the use of expensive installation equipment and lubrication heretofore required for installing elastomeric bumpers on the mounting studs.

A still further objective of the invention is to provide such an improved air spring which is lighter in weight, easier and less expensive to assemble, and which can carry greater loads at equivalent deflections than the heretofore used elastomeric bumpers.

A further objective of the invention is to provide such an improved air spring in which the internal bumper is an integral one-piece member formed of plastic having concentrically spaced inner and outer walls connected by radially extending reinforcing ribs.

These objectives and advantages are obtained by the improved air spring construction of the invention, the general nature of which may be stated as being an air spring of the type having a pair of spaced end members adapted to be mounted at spaced locations and a flexible sleeve formed of an elastomeric material sealingly engaged with the end members and forming a pressurized fluid chamber therebetween; said improvement including, a post mounted on one of the end members and extending into the fluid chamber; said post having an enlarged end portion forming an undercut; and a shock absorbing bumper mounted on the post for possible impact engagement with the other of said end members, said bumper being formed of a one-piece plastic member having a base formed with a central opening defined by a plurality of circumferentially spaced flexible fingers, said fingers being snap-fitted over the enlarged end portion of the post and engaged in the undercut thereof for mounting said bumper on the post.

BRIEF DESCRIPTION OF THE DRAWINGS

A preferred embodiment of the invention, illustrative of the best mode in which applicants have contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENT

Figure 1:
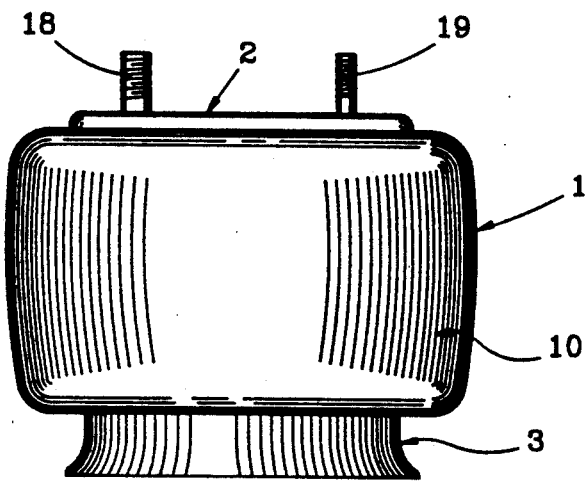
FIG. 1 is a perspective view of an air spring of the type in which the improved snap-on bumper is utilized.
Figure 2:
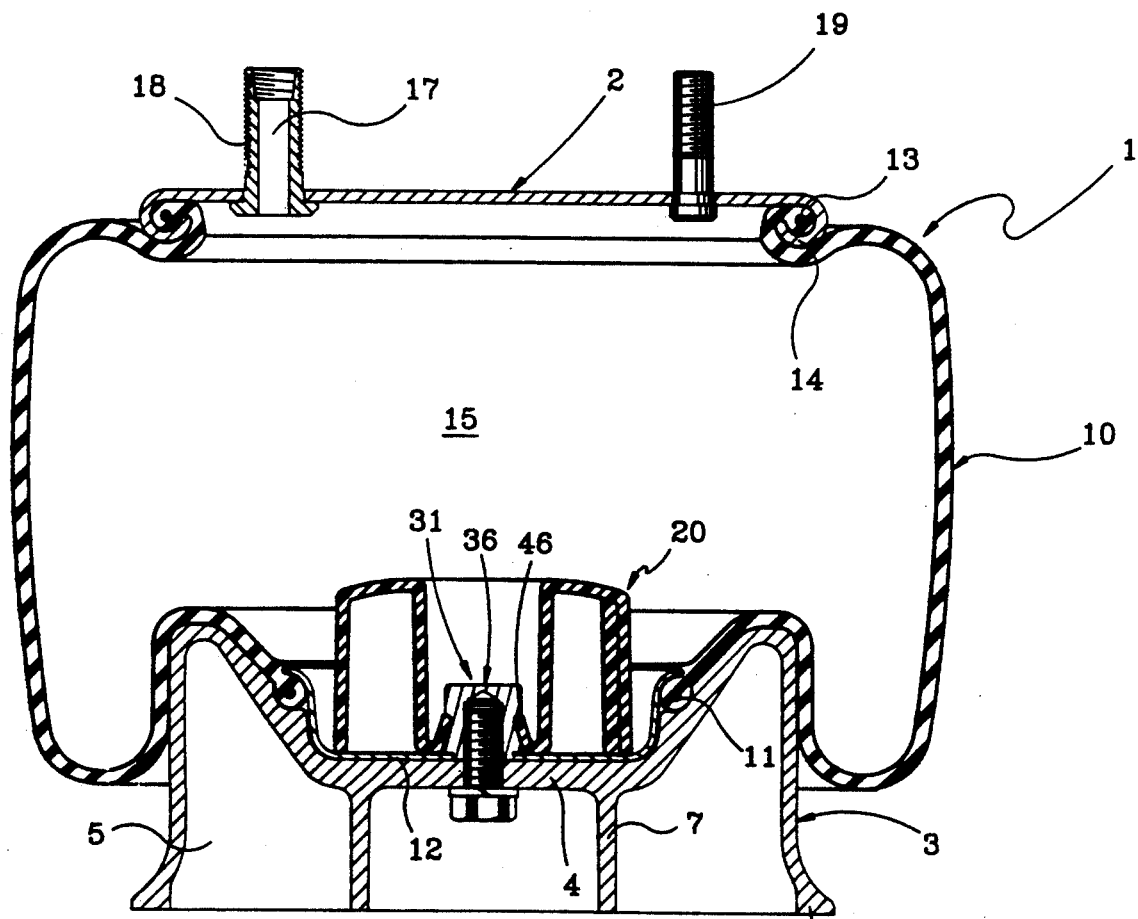
FIG. 2 is an enlarged vertical sectional view of the improved air spring and snap-on bumper.

The improved air spring of the invention is indicated generally at 1, and is shown in an unmounted, at-rest position in FIG. 1. Air spring 1 includes an upper end cap member and an opposed axially spaced piston member, indicated generally at 2 and 3, respectively (FIG. 2). Piston 3 is of a usual construction, preferably having an inverted generally bowl-shaped configuration formed of a suitable material such as aluminum, steel, high strength plastic or the like. Piston 3 includes a base 4 and an annular wall 5 extending downwardly from the base, terminating in a peripheral edge 6. A central supporting structure 7 is joined with and extends downwardly from base 4.

One end of a flexible sleeve which is indicated generally at 10, terminates in a lower bead 11 which is clamped on base 4 of piston 3 by a clamping plate 12 in an air tight sealing relationship with piston 3. The other end of sleeve 10 has an end bead 13 which is secured in a curled marginal edge 14 of mounting end cap 2 in an air tight sealing relationship therewith, providing a fluid tight chamber 15 within elastomeric sleeve 10. Other types of end sealing arrangements may be utilized without effecting the concept of the invention, such as shown in U.S. Pat. Nos. 4,852,861, 4,787,606 and 4,946,144, which are assigned to the same entity as is the present invention, which do not require a beaded end seal.

A source of pressurized air or other fluid, communicates with chamber 15 through a hollow bore 17 of a mounting stud 18 extending outwardly from end plate 2. One or more additional mounting studs 19 are mounted on end cap 2 and extend upwardly therefrom for mounting air spring 1 on a vehicle, machine tool or other application in which it is to be used.

Figure 4:
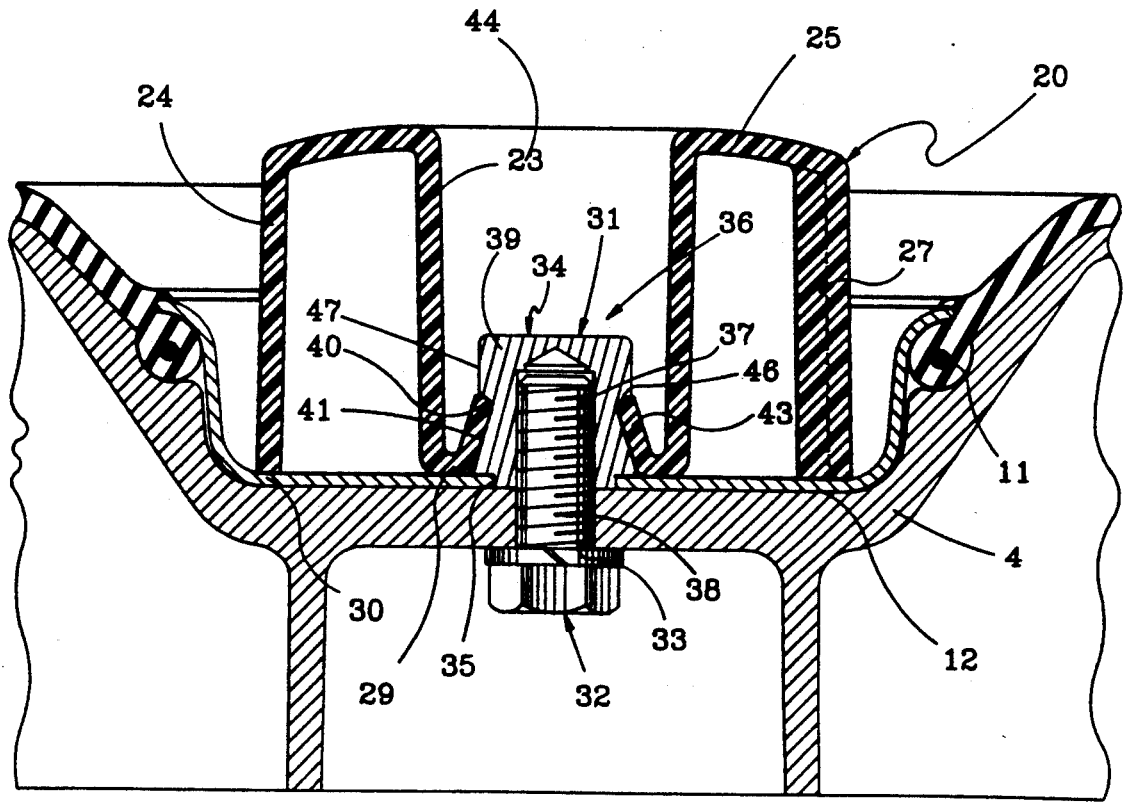
FIG. 4 is an enlarged fragmentary sectional view similar to FIG. 3, showing the bumper fully mounted on the central post within the air spring.
Figure 5:
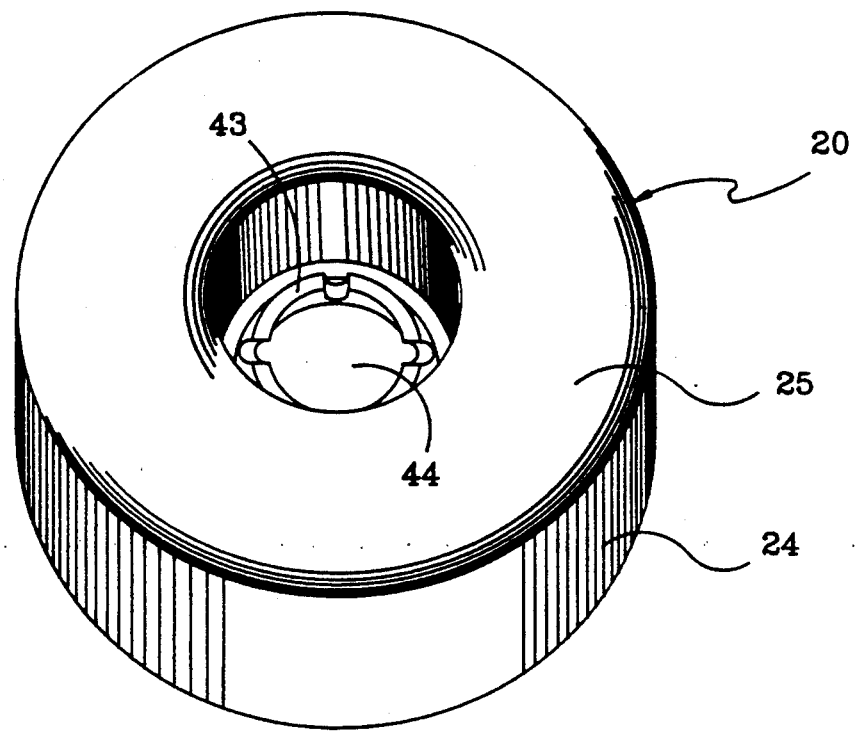
FIG. 5 is an enlarged perspective view of the improved snap-on bumper.

The particular air spring construction described above and shown in the drawings and particularly in FIGS. 1, 2 and 4, may vary without affecting the concept of the invention.

In accordance with the invention, an improved snap-on bumper indicated generally at 20, is mounted on base 4 of piston 3 and extends upwardly therefrom into chamber 15. Bumper 20 engages end cap 2 in the event of a failure of the pressurized fluid within air chamber 15, or assists in absorbing excessive shock forces exerted on either of the end members.

Figure 6:
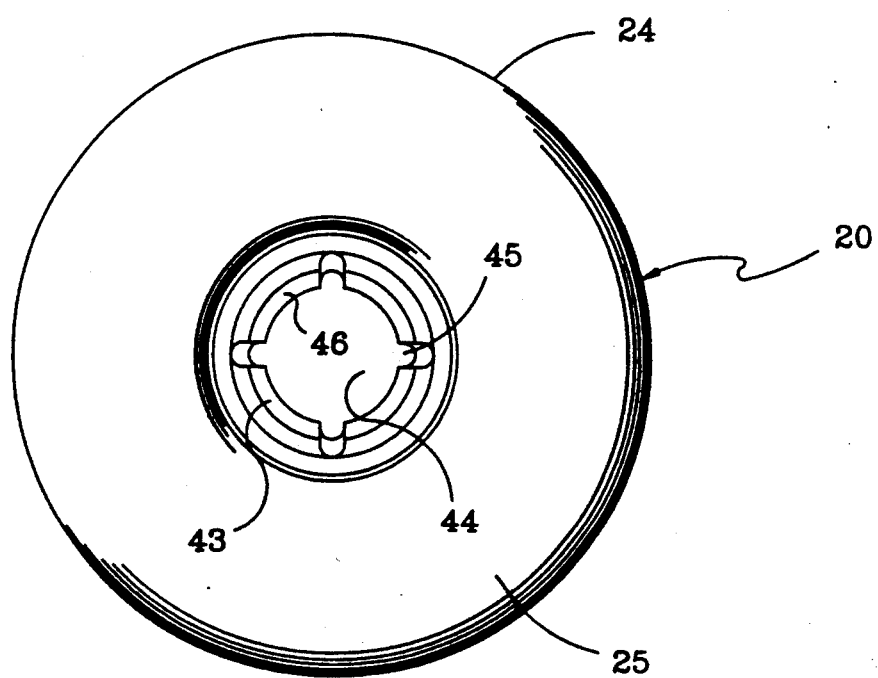
FIG. 6 is a top plan view of the bumper.
Figure 7:
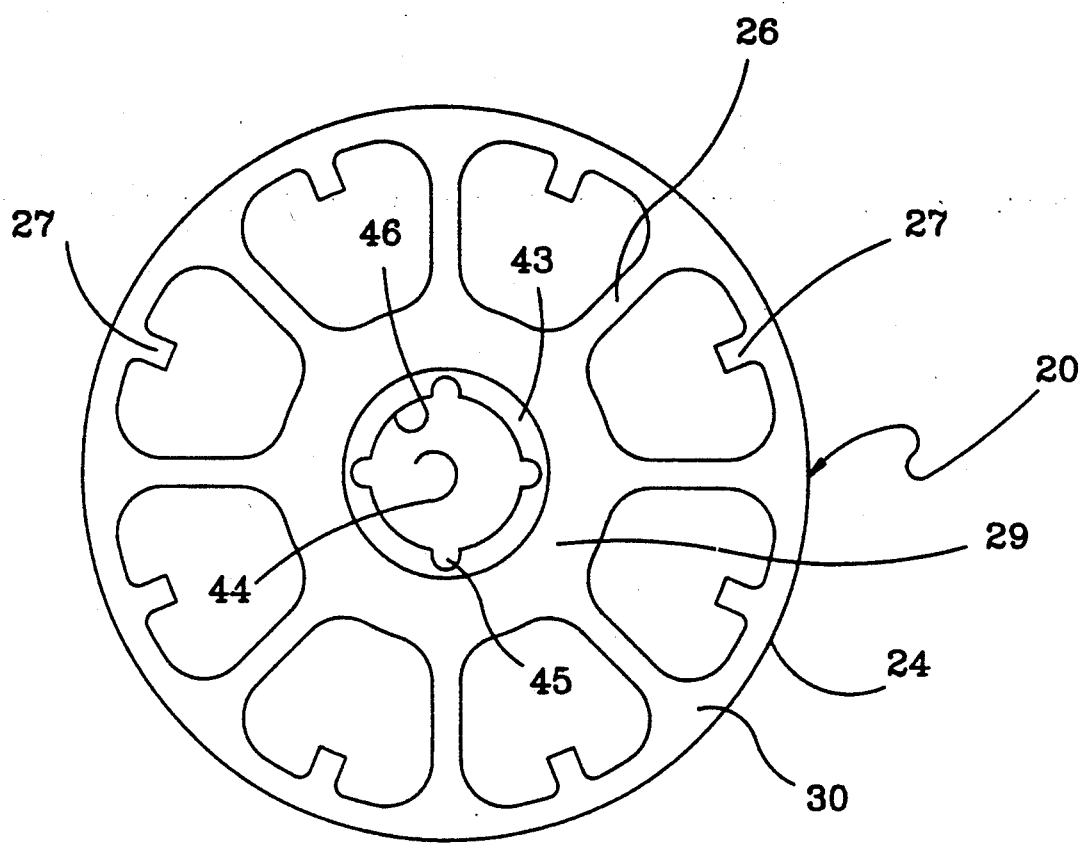
FIG. 7 is a bottom plan view of the bumper.

Bumper 20 includes inner and outer generally cylindrical walls 23 and 24, respectively, concentrically arranged with each other which terminate in an integral dome-shaped connecting top wall 25. As shown particularly in FIG. 7, a plurality of radially extending reinforcing ribs 26 are formed integrally with inner and outer walls 23 and 24 and extend therebetween to provide a rigid integrally formed one-piece bumper member. A second plurality of reinforcing ribs 27 are located between adjacent pairs of reinforcing ribs 26, and extend radially inwardly toward inner wall 23 from outer wall 24 only a short distance to provide increased strength for outer wall 24. Inner wall 23 terminates in an annular base 29 which lies in the same plane as does the annular peripheral edge 30 of outer wall 24 as shown particularly in FIG. 6.

Plate 12 is secured in a fluid tight clamping relationship with sleeve bead 11 by a threaded clamping stud 32 which extends through an opening 33 formed in base 4 in cooperation with an end cap, indicated generally at 34. Cap 34 preferably is formed of a mild steel and is secured to clamp plate 12 by brazing at 35. The interior of end cap 34 has a threaded bore 37 for threaded connection with threaded shaft 38 of clamping stud 32, and together form a central bumper attachment post 36. Other types of attachment posts 36 may be utilized than that shown in the drawings, without effecting the concept of the invention. For example, post 36 could be molded of a high strength plastic integral with a plastic piston member 3, or could be welded or brazed to an inside surface of a metal piston member. Both of these constructions would eliminate an opening being required through the base of the piston.

In accordance with one of the features of the invention, end cap 34 is formed with an enlarged outer end 39 which forms an annular undercut 40 adjacent the outwardly tapering annular side wall 41 of post 36. In further accordance with the invention, bumper 20 is formed with a plurality of flexible angled fingers 43 which extend upwardly inwardly into a hollow interior 44 formed by inner wall 23.

In the preferred embodiment, there are four flexible fingers 43 spaced circumferentially apart by intervening areas 45 (FIG. 6), with each finger terminating in an outer arcuate edge 46 which snaps into and seats in undercut 40. Arcuate edges preferably have arcuate lengths or angles of approximately 75 degrees each, and are inclined inwardly and form an included angle of approximately 20 degrees with inner wall 23.

Figure 3:
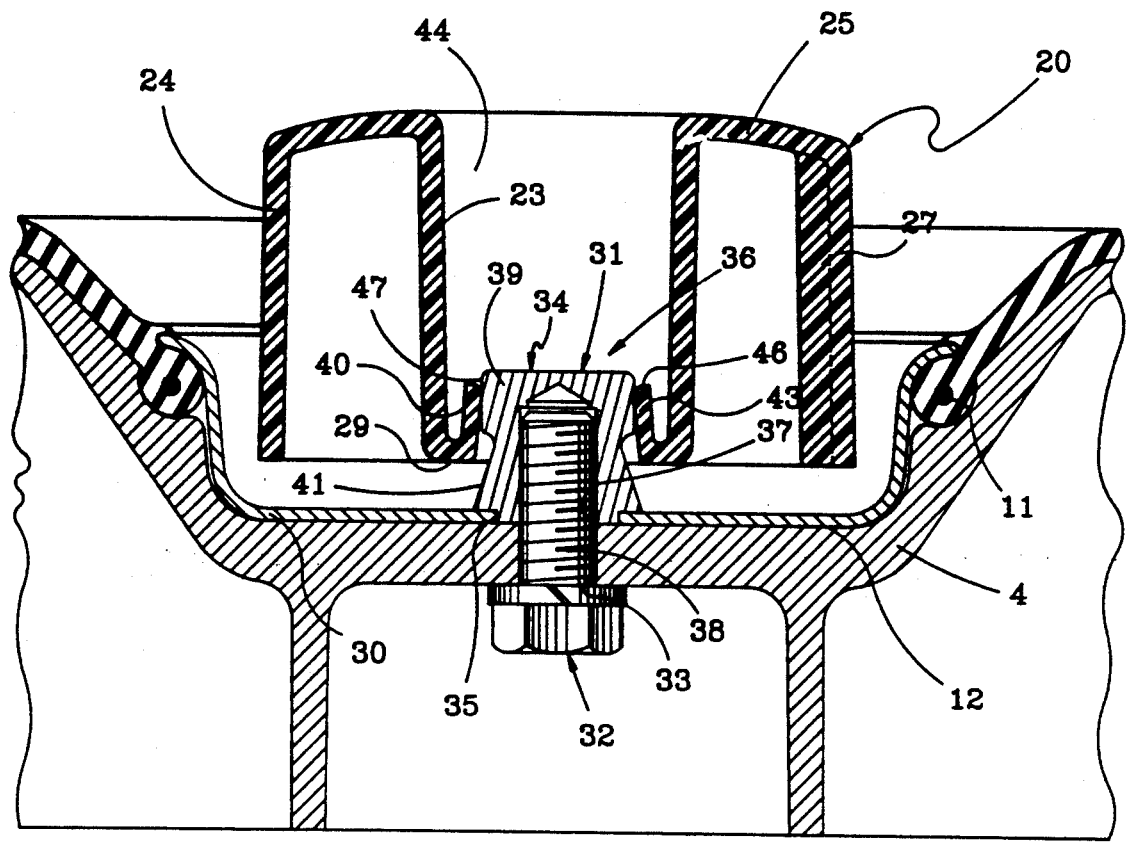
FIG. 3 is an enlarged fragmentary sectional view showing the bumper starting to be mounted on the central post of the air spring.

Post 36 forms a vertically extending member located within the interior 44 of bumper 20 with flexible fingers 43 enabling bumper 20 to be snap-fitted on end cap 34 of the mounting post as shown in FIGS. 3 and 4, by flexing outwardly as it is being forced downwardly on the mounting post. Immediately upon edges 46 of finger 43 moving beyond cylindrical side wall portion 47 of enlarged post end 39, the flexibility of the fingers will enable them to snap into position in undercut 40. When bumper 20 is in position on post 36, annular base 29 will seat upon clamp plate 12, firmly mounting bumper 20 in position within pressure chamber 15. Thus, fingers 43 are secured between undercut 40 and clamp plate 12 and the flexibility of fingers 43 retain the arcuate edges thereof, in undercut 40, with the slope surfaces of the fingers lying along tapered side wall 41 of end cap 34.

Bumper 20 is formed of a high strength polyester elastomer or plastic such as sold under the trademark HYTREL, by Du Pont de Nemorus Company of Wilmington, Del. The type of HYTREL found most suitable is Dupont's grade 8238 which has a hardness Durometer D of 82, a tensile strength at break of 6800 psi and an elongation at break of 350%. Bumper 20 also may be configured square, cloverleaf etc., and need not be cylindrical as described above and shown in the drawings, without effecting the concept of the invention.

Thus, the improved air spring of the invention, and in particular snap-on bumper 20 thereof, enables the bumper to be installed easily on center post 36 by snap-fitting the bumper in a vertical downward direction over enlarged end 39 of the post, with flexible fingers 43 snapping into position into undercut 40 formed beneath enlarged end 39. This provides a bumper and resulting air spring, which is lighter in weight than prior art bumpers formed of an elastomeric material and, most importantly, enables the bumper to be snap-fitted into position without requiring lubricant and extra equipment heretofore required for installing the elastomeric bumper. Also, the high strength plastic of bumper 20 enables it to absorb greater load shocks at equivalent deflections than that absorbed by the prior elastomeric bumpers.

Accordingly, the improved snap-on bumper is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved air spring containing the snap-on bumper is constructed and used, the characteristics of the construction, and the advantageous, new and useful results obtained; the new and useful structures, devices, elements, arrangements, parts and combinations, are set forth in the appended claims.

We claim:

1. An improved air spring of the type having a pair of spaced end members adapted to be mounted at spaced locations and a flexible sleeve formed of an elastomeric material sealingly engaged with the end members and forming a pressurized fluid chamber therebetween, said improvement including a post mounted on one of the end members and extending into the fluid chamber, said post having an enlarge end portion and an undercut formed beneath said end portion; and a shock absorbing bumper mounted on the post for possible impact engagement with the other of said end members, said bumper being formed of a one-piece plastic member having a base formed with a central opening defined by a plurality of circumferentially spaced flexible fingers, said finger being inclined inwardly and upwardly toward the enlarged and portion of the post and are snap-fitted over the enlarged end portion of the post and seated in the undercut thereof for mounting said bumper on the post.

2. The improved air spring defined in claim 1 in which the bumper has a generally cylindrical configuration with concentrically mounted spaced inner and outer walls; and in which a plurality of first reinforcing ribs extend radially between and are connected to said spaced walls.

3. The improved air spring defined in claim 2 in which the inner wall defines a central bore; and in which the base is formed integrally with said inner wall and the flexible finger extends into said central bore.

4. The improved air spring defined in claim 1 in which the fingers terminate in arcuate edges which lie in an imaginary circle; and in which the arcuate edges seat in the undercut of the post and engage the enlarged end portion of said post.

5. The improved air spring defined in claim 1 in which there are four arcuate fingers spaced circumferentially apart; and in which each of said fingers have an arcuate angle of approximately 75°.

6. The improved air spring defined in claim 4 in which each of the flexible fingers form an included angle with the inner wall of approximately 20°.

7. The improved air spring defined in claim 2 in which an annular end wall is formed integrally with and extends between the inner and outer walls opposite of the base.

8. The improved air spring defined in claim 7 in which the annular end wall is dome-shaped.

9. The improved air spring defined in claim 2 in which a plurality of second reinforcing ribs are formed on the outer wall and are located between respective pairs of the first reinforcing ribs, and extend radially toward the inner wall.

10. The improved air spring defined in claim 3 in which the outer wall terminates in an annular edge; and in which said annular edge and base lie in a common plane.

11. The improved air spring defined in claim 1 in which the post includes a central shaft mounted on the said one end member and a separate end cap mounted on said shaft which forms the enlarged end portion.

12. The improved air spring defined in claim 11 in which the end cap is formed of metal; and in which the shaft has a threaded end for mounting the end cap thereon.

13. The improved air spring defined in claim 1 in which one of the end members is a piston.

14. The improved air spring defined in claim 1 in which the bumper has a Durometer D hardness of approximately 82.

15. The air spring defined in claim 1 in which the bumper has a tensile strength at break of approximately 6800 psi.

16. The air spring defined in claim 1 in which the bumper has an elongation at break of approximately 350%.

17. The air spring defined in claim 1 in which the base of the bumper lies in a common plane; and in which said base is seated firmly on the said one end member when the flexible fingers are snap-fitted over the end portion of the post.

* * * * *